(12) United States Patent
Lin

(10) Patent No.: US 11,722,251 B2
(45) Date of Patent: *Aug. 8, 2023

(54) DATA TRANSMISSION METHOD AND DEVICE

(71) Applicant: GUANGDONG OPPO MOBILE TELECOMMUNICATIONS CORP., LTD., Guangdong (CN)

(72) Inventor: YaNan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 190 days.

This patent is subject to a terminal disclaimer.

(21) Appl. No.: 17/241,937

(22) Filed: Apr. 27, 2021

(65) Prior Publication Data
US 2021/0250127 A1 Aug. 12, 2021

Related U.S. Application Data

(63) Continuation of application No. 16/475,323, filed as application No. PCT/CN2017/070486 on Jan. 6, 2017, now Pat. No. 11,128,403.

(51) Int. Cl.
*H04W 4/00* (2018.01)
*H04L 1/08* (2006.01)
(Continued)

(52) U.S. Cl.
CPC ............ *H04L 1/08* (2013.01); *H04W 72/1263* (2013.01); *H04W 72/23* (2023.01)

(58) Field of Classification Search
CPC ....... H04L 1/08; H04L 5/0053; H04L 1/1657; H04L 1/1671; H04L 1/1887; H04L 1/16;
(Continued)

(56) References Cited

U.S. PATENT DOCUMENTS 11,128,403 B2 * 9/2021 Lin .................. H04W 72/1263
11,595,991 B2 * 2/2023 Wong .................. H04L 1/1861
(Continued)

FOREIGN PATENT DOCUMENTS

AU    2007203852 B2    8/2010
CN       1661952 A     8/2005
(Continued)

OTHER PUBLICATIONS

Huawei, HiSiicon, HARQ timing relationships for grant free transmission, Aug. 22-26, 2016, 3GPP TSG RAN WG1 Meeting #86, R1-167206, pp. 1-2. (Year: 2016).*
(Continued)

*Primary Examiner* — Phuongchau Ba Nguyen
(74) *Attorney, Agent, or Firm* — Ladas & Parry LLP

(57) ABSTRACT

Provided are a data transmission method and device. The method includes that a terminal sends uplink data in a grant-free manner, detects grant information within a target time window and generates a detection result, the grant information being used for indicating configuration information about a data transmission channel, and the terminal determines, according to the detection result, whether to repeatedly send the uplink data. The embodiments of the present invention facilitate the reduction of a data transmission delay and improve the efficiency, intelligence and stability of data transmission.

17 Claims, 8 Drawing Sheets

(51) Int. Cl.
*H04W 72/1263* (2023.01)
*H04W 72/23* (2023.01)

(58) Field of Classification Search
CPC .............. H04L 5/0044; H04L 5/0007; H04W 72/1263; H04W 72/23; H04W 72/04; H04W 72/0446; H04W 72/1268; H04W 72/12; H04W 28/04; H04W 72/042; H04W 88/08; H04W 74/0833; H04W 72/0406; H04W 74/0841
See application file for complete search history.

(56) References Cited

U.S. PATENT DOCUMENTS

| | | | |
|---|---|---|---|
| 2009/0150739 | A1 | 6/2009 | Park |
| 2012/0263153 | A1 | 10/2012 | Park |
| 2013/0163537 | A1 | 6/2013 | Anderson et al. |
| 2013/0223372 | A1 | 8/2013 | Park et al. |
| 2014/0192767 | A1 | 7/2014 | Au et al. |
| 2015/0312935 | A1 | 10/2015 | Lohr et al. |
| 2016/0323911 | A1 | 11/2016 | Au et al. |
| 2016/0352454 | A1 | 12/2016 | Zhang et al. |
| 2017/0251500 | A1* | 8/2017 | Agiwal ............. H04W 74/0833 |
| 2017/0288817 | A1* | 10/2017 | Cao ....................... H04L 1/0079 |
| 2018/0123765 | A1* | 5/2018 | Cao ....................... H04L 1/1896 |
| 2018/0152907 | A1* | 5/2018 | Zhang ............... H04W 56/0045 |
| 2018/0160410 | A1* | 6/2018 | Xia ........................ H04W 72/23 |
| 2018/0176945 | A1 | 6/2018 | Cao |
| 2018/0317244 | A1* | 11/2018 | Um ................... H04W 72/1215 |
| 2019/0174472 | A1 | 6/2019 | Lee et al. |
| 2021/0250127 | A1* | 8/2021 | Lin ....................... H04L 1/1671 |

FOREIGN PATENT DOCUMENTS

| | | |
|---|---|---|
| CN | 101361309 A | 2/2009 |
| CN | 101778420 A | 7/2010 |
| CN | 102571298 A | 7/2012 |
| CN | 104838713 A | 8/2015 |
| CN | 105637962 A | 6/2016 |
| CN | 106160787 A | 11/2016 |
| EP | 3565150 A1 | 11/2019 |
| RU | 2494576 C2 | 9/2013 |
| RU | 2523359 C2 | 7/2014 |
| WO | 2007148881 A2 | 12/2007 |
| WO | 2013096555 A1 | 6/2013 |
| WO | 2015122701 A1 | 8/2015 |

OTHER PUBLICATIONS

Huawei, HiSiicon, The retransmission and HARQ schemes for grant free, Oct. 10-14, 2016, 3GPP TSG RAN WG1 Meeting #86bis, R1-1608859, pp. 1-5. (Year: 2016).*
Nokia, Alcatel-Lucent Shangai Bell, Grant Free to Grant Based switching for URLLC, Nov. 14-18, 2016, 3GPP TSG RAN WG1 Meeting #87, R1-1612253, pp. 1-3. (Year: 2016).*
Intel Corporation, Retransmissions and repetitions for UL grant free NOMA schemes,Oct. 101-14, 2016, 3GPP TSG RAN WG1 Meeting #86bis, R1-1609502, pp. 1-5. (Year: 2016).*
First Office Action of the Taiwanese application No. 106144947, dated Aug. 31, 2021.
Second Office Action of the Japanese application No. 2019-536038, dated Sep. 28, 2021.
First Office Action of the Indonesian application No. P00201906730, dated Oct. 5, 2021.
Office Action of the Australian application No. 2017391828, dated Sep. 20, 2021.
Second Office Action of the Australian application No. 2017391828, dated Nov. 30, 2021.
Second Office Action of the Israeli application No. 267735, dated Dec. 20, 2021.
European Search Report in European application No. 22168444.2, dated Jul. 14. 2022.
First Office Action of the Vietnamese application No. 1-2019-03901, dated Jul. 20, 2022.
Decision of Refusal of the Japanese application No. 2019-536038, dated Apr. 15, 2022.
ZTE, "Discussion on Grant-Free Transmission Based on Sensing", 3GPP TSG RAN WG1 Meeting #86bis R1-1609801, Oct. 14, 2016 (Oct. 14, 2016), section 4.
International Search Report in the international application No. PCT/CN2017/070486, dated Sep. 30, 2017.
Written Opinion of the International Search Authority in the international application No. PCT/CN2017/070486, dated Sep. 30, 2017.
Samsung, ZTE, ZTE Microelectronics, Interdigital,Convida Wireless, Qualcomm, NTT DOCOMO, HTC, Fraunhofer HHI. "WF on CB or CB-group based retransmission", 3GPP TSG RAN1#88, R1-1703740, Athens, Greece, Feb. 13-17, 2017.
ZTE. "Discussion on grant-free transmission for URLLC", 3GPP TSG RAN WG1 Meeting #87, R1-1611296, Reno, USA, Nov. 14-18, 2016.
Nokia, Alcatel-Lucent Shanghai Bell. "Grant-free HARQ for URLLC", 3GPP TSG-RAN WG1#87, R1-1612252, Reno, NV, USA Nov. 14-18, 2016.
Huawei, HiSilicon: "HARQ design for UL URLLC". 3GPP Draft: R1-1611658, 3rd Generation Partenership PROJECT(3GPP), Mobile Competence Centre; 650, Route Des Lucioles; F-06921 Sophia-Anti Polis Cedex; France, vol. RAN WG1, No. Reno, Nevada, USA; Nov. 14, 2016-Nov. 18, 2016 Nov. 13, 2016(Nov. 13, 2016), XP051175630. *p. 5*.
Supplementary European Search Report in the European application No. 17889811.0, dated Nov. 14, 2019.
First Office Action of the European application No. 17889811.0, dated Aug. 27, 2020.
Second Office Action of the European application No. 17889811.0, dated Mar. 12, 2021.
Office Action of the Indian application No. 201917029326, dated Nov. 6, 2020.
Huawei, HiSilicon, The retransmission and HARQ: schemes for grant-free [online], 3GPP TSG-RAN WG1#86b R1-1608859.
Intel Corporation, Retransmissions and repetitions for UL grant-free NOMA schemes [online], 3GPP TSG-RAN WG1#86b R1-1609502.
Nokia, Alcatel-Lucent Shanghai Bell, Grant-free to grant-based switching for URLLC [online], 3GPP TSG RAN WG1 #87 R1-1612253.
Huawei, HiSilicon, HARQ timing relationships for grant-free transmission [online] 3GPP TSG-RAN WG1#86 R1-167206.
First Office Action of the Japanese application No. 2019-536038, dated Jan. 26, 2021.
First Office Action of the Chilean application No. 201901830, dated Apr. 20, 2020.
Written Opinion of the Singaporean application No. 11201906091S, dated Oct. 14, 2020.
First Office Action of the Canadian application No. 3048686, dated Aug. 3, 2020.
First Office Action of the Russian application No. 2019124857. dated Apr. 2, 2020.
First Office Action of the Israeli application No. 267735, dated Dec. 27, 2020.
ZTE, ZTE Microelectronics, "Discussion on HARQ for Grant Free Based Transmission", 3GPP TSG RAN WG1 Meeting #87, R1-1611501, Nov. 30, 2016.
Huawei, HiSilicon, "Consideration on grant free transmission for NR", 3GPP TSG-RAN WG2 Meeting #95, R2-165442, Aug. 31, 2016.
First Office Action of the Chinese application No. 201780078507.0, dated Mar. 9, 2020.
Second Office Action of the Chinese application No. 201780078507.0, dated Jul. 8, 2020.
Third Office Action of the Chinese application No. 201780078507.0, dated Oct. 16, 2020.
Non-Final Office Action of the U.S. Appl. No. 16/475,323, dated Sep. 30, 2020.
Second Office Action of the Mexican application No. MX/a/2019/008181, dated Jan. 10, 2023.

(56) References Cited

OTHER PUBLICATIONS

First Office Action of the Malaysian application No. PI2019003880, dated Jan. 13, 2023.

* cited by examiner

DATA TRANSMISSION METHOD AND DEVICE

CROSS-REFERENCE TO RELATED APPLICATION

This application is a continuation of U.S. patent application Ser. No. 16/475,323 filed on Jul. 1, 2019 which is a U.S. national stage of International Patent Application No. PCT/CN2017/070486 filed on Jan. 6, 2017, the disclosures of each of which are incorporated herein by reference in their entireties.

BACKGROUND

Wide coverage of fourth generation (4G) mobile communication networks, such as a Long Term Evolution (LTE) network, has been realized. The 4G networks have a fast communication speed, wide network spectrum, flexible communication and the other features. With the network requirements such as the Internet of Things and the Internet of Vehicles, users have increasingly demand for the next generation mobile communication network, i.e., a fifth generation (5G) mobile communication network, for example, demanding a data rate for user experience to reach 100 megabytes per second (Mbps) in continuous wide area coverage, demanding a data rate for user experience to reach 1 gigabytes per second (Gbps) for hotspots, demanding an air interface delay to be within 1 millisecond (ms), demanding an end-to-end delay to be within 100 ms, as well as demanding for guarantee of reliability.

In a current 5G (NR, new radio) system, a grant-free uplink transmission is supported, that is, when a terminal has data to transmit, the data can be transmitted without waiting for granting of a base station. This transmission mode is beneficial to reduction in control signaling overheads of a system, in end-to-end delay, in power consumption of a terminal. Therefore, such a transmission mode is particularly applicable to small packet services with low frequencies and services with low-delay requirements. One of problems that this transmission mode has is how a terminal determines whether a base station correctly receives uplink data from the terminal.

SUMMARY

The present disclosure relates to the field of communications, and in particular to a data transmission method and device.

According to a first aspect, a data transmission method is provided in an embodiment of the present disclosure, which includes:

transmitting, by a terminal, uplink data without grant information;

retransmitting, by the terminal, the uplink data in a case that grant information is detected by the terminal within a time window and a value of an information field of the grant information is a preset value, wherein the grant information is configured to indicate configuration information of an uplink data transmission channel.

According to a second aspect, a data transmission method is provided in an embodiment of the present disclosure, which includes:

receiving, by a network device, uplink data without grant information from a terminal;

transmitting, by the network device, grant information within a time window, wherein the grant information is configured to indicate configuration information of an uplink data transmission channel, and a value of an information field of the grant information is a preset value; and receiving, by the network device, the uplink data again in a case that the grant information is received by the terminal within the time window.

According to a third aspect, a terminal is provided in an embodiment of the present disclosure, which includes a processor and a transceiver configured to transmit and receive information under control of the processor. The transceiver is configured to transmit uplink data without grant information, and retransmit the uplink data in a case that grant information is detected by the terminal within a time window and a value of an information field of the grant information is a preset value, wherein the grant information is configured to indicate configuration information of an uplink data transmission channel.

BRIEF DESCRIPTION OF THE DRAWINGS

The drawings used in description of the embodiments or the conventional technologies will be briefly described below.

DETAILED DESCRIPTION OF EMBODIMENTS

Technical solutions of the embodiments of the present disclosure are described in conjunction with the drawings hereinafter.

Figure 1:
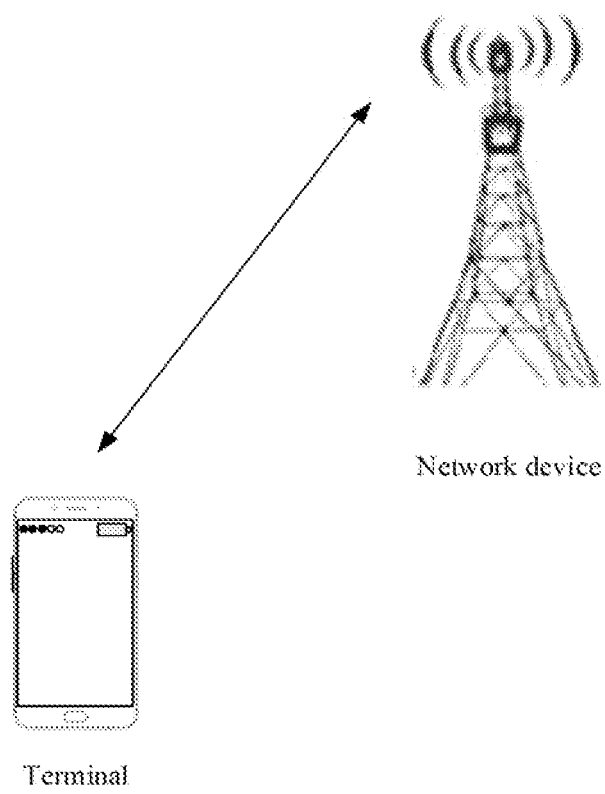
FIG. 1 is a network architecture diagram of a possible communication system according to an embodiment of the present disclosure.

Reference is made to FIG. 1, which shows a possible network architecture according to an embodiment of the present disclosure. The network architecture includes a network device and a terminal. When the terminal accesses a mobile communication network provided by the network device, the terminal and the network device may be communicated via a wireless link. For example, the network device may be a base station in a 5G network or in a hybrid network system of 5G network and 4G network. In the embodiments of the present disclosure, terms "network" and "system" are often used alternately, and meanings of the terms can be understood by those skilled in the art. The terminal involved in the embodiment of the present disclosure may refer to devices with a wireless communication function, such as handheld devices, on-board devices, wearable devices and computing devices, or other processing devices connectable to a wireless modem, or User Equipment (UE), Mobile Stations (MS), terminal devices and the like in various forms. For ease of description, the devices and equipment mentioned above are all called terminals.

Figure 2A:
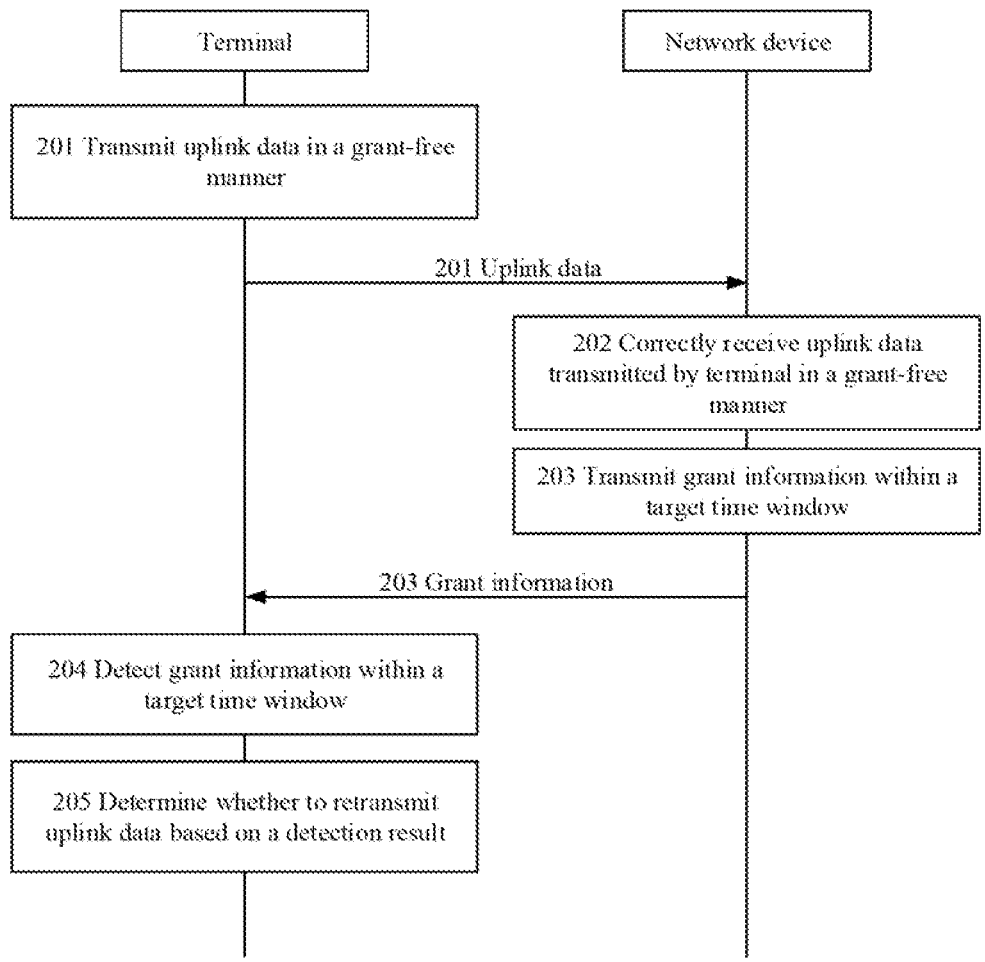
FIG. 2A is a schematic flow chart of a data transmission method according to an embodiment of the present disclosure.

Reference is made to FIG. 2A, which shows a data transmission method according to an embodiment of the present disclosure. The data transmission method is applied to a mobile communication network which includes a network device and a terminal. The network device may be communicated with the terminal. The method is described from a terminal side, which includes the following operations 201 to 203.

In operation 201, the terminal transmits uplink data in a grant-free manner.

In operation 202, the network device correctly receives the uplink data transmitted by the terminal in the grant-free manner.

In operation 203, the network device transmits grant information within a target time window, the grant information being to inform the terminal that the network device receives the uplink data correctly and to indicate configuration information of a data transmission channel.

In operation 204, the terminal detects the grant information within a target time window and generates a detection result, the grant information being to indicate the configuration information of the data transmission channel.

In operation 205, the terminal determines, based on the detection result, whether to retransmit the uplink data.

It may be seen that in the embodiment of the present disclosure, the terminal may reduce a waiting delay in preparation for data transmission between the terminal and the network device, transmit uplink data timely without grant from the network device, and accurately determine whether the uplink data needs to be retransmitted, which is beneficial to reducing a data transmission delay and increasing efficiency, accuracy and stability of data transmission.

In a possible example, the method may further include the following operation.

The network device transmits indication information, the indication information being to indicate a length of the target time window and/or a start position of the target time window.

In the possible example, the method may further include the following operation.

The terminal receives the indication information, the indication information being to indicate the length of the target time window and/or the start position of the target time window.

In a possible example, the start position of the target time window may be any one of the following:

an ending position of the uplink data, an ending position of a time unit for the uplink data, a start position of a A-th time unit after the time unit for the uplink data, and a start position of a B-th downlink control information transmission unit after the uplink data, where A and B are positive integers.

Figure 2B:
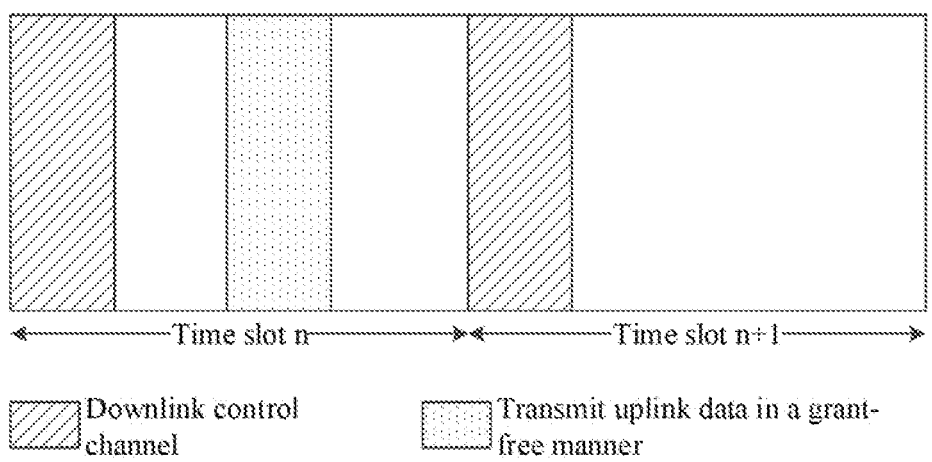
FIG. 2B is a schematic diagram of a start position of a target time window according to an embodiment of the present disclosure.

For example, as shown in FIG. 2B, it is assumed that the network device correctly receives uplink data transmitted in the grant-free manner in a time slot n by the terminal. A time slot (n+1) is a time slot after the time slot n and is for transmission of downlink control signaling. The network device may transmit grant information in the time slot (n+1).

In a possible example, the target time window may include L downlink control information transmission units, the downlink control information transmission unit being configured to transmit downlink control signaling, L being a positive integer.

Figure 2C:
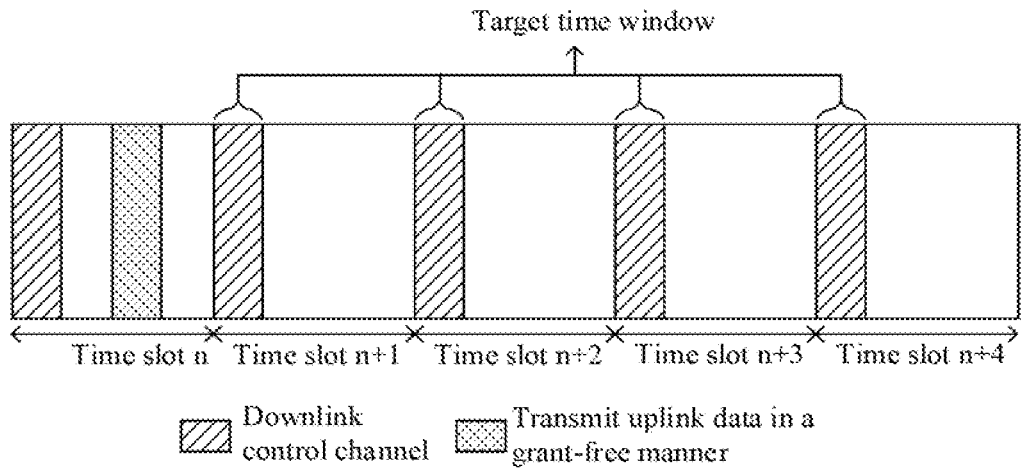
FIG. 2C is a schematic diagram illustrating that a network device transmits uplink data within a target time window according to an embodiment of the present disclosure.

For example, as shown in FIG. 2C, it is assumed that the target time window includes four downlink control information transmission units, and that the network device correctly receives uplink data transmitted in the grant-free manner in a time slot n by the terminal, the network device may transmit grant information in any one of the four downlink control information transmission units as shown in FIG. 2C.

In a possible example, the target time window may include N time units, a length of each of the N time units is equal to a length of a target time unit, the target time unit is a time unit in which the terminal transmits the uplink data in the grant-free manner, N is a positive integer.

Figure 2D:
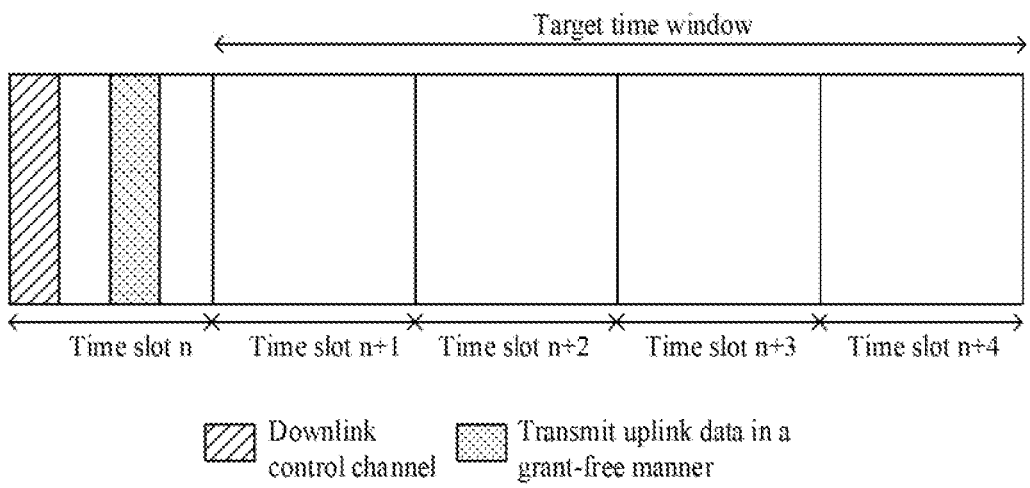
FIG. 2D is another schematic diagram illustrating that a network device transmits uplink data within a target time window according to an embodiment of the present disclosure.

For example, as shown in FIG. 2D, it is assumed that the target time window includes four time units, the length of the target time unit is one time slot, and that the network device correctly receives the uplink data transmitted in the grant-free manner in a time slot n by the terminal, the network device may transmit the grant information within the target time window consisting of a time slot (n+1), a time slot (n+2), a time slot (n+3) and a time slot (n+4).

In a possible example, the target time window may include N time units, a length of each of the N time units is equal to a length of a downlink data transmission unit, the downlink control information transmission unit being configured for the network device to transmit downlink data.

Figure 2E:
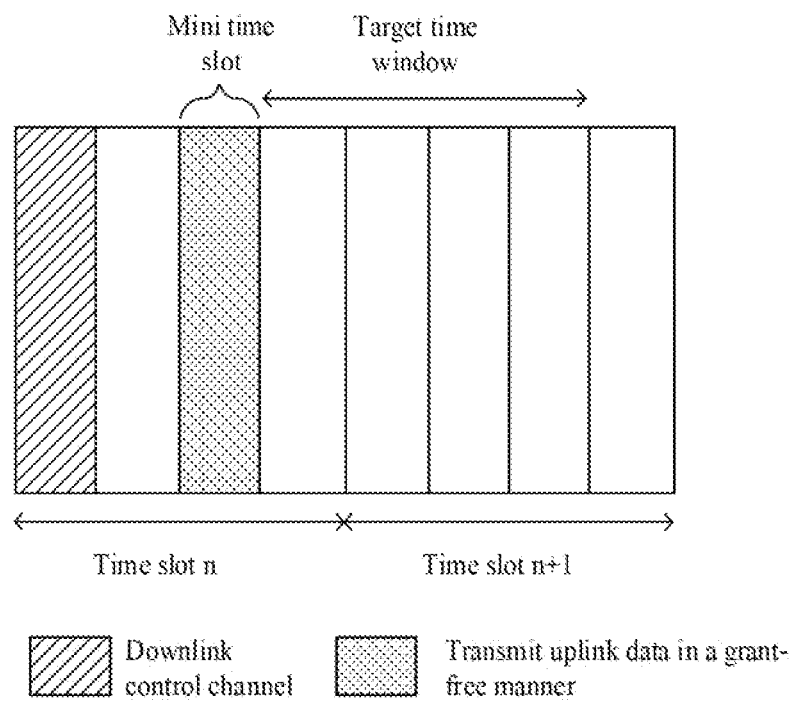
FIG. 2E is still another schematic diagram illustrating that a network device transmits uplink data within a target time window according to an embodiment of the present disclosure.

For example, as shown in FIG. 2E, it is assumed that the target time window includes four time units, the length of the downlink data transmission unit is a mini time slot, and that the network device correctly receives uplink data transmitted in the grant-free manner in a time slot n by the terminal, the network device may transmit grant information within the target time window consisting of four mini time slots after a target time unit.

In a possible example, the grant information may be to schedule transmission of uplink data; or the grant information is to schedule transmission of uplink data, a time length for transmitting the uplink data being equal to a length of a target time unit, the target time unit being a time unit in which the terminal transmits the uplink data in the grant-free manner.

In a possible example, the grant information may be to schedule downlink data transmission.

In a possible example, a process of the terminal determining whether to retransmit the uplink data based on the detection result may include the following operation.

The terminal determines that the detection result is that the grant information is received, and determines that the network device receives the uplink data correctly.

Figure 2F:
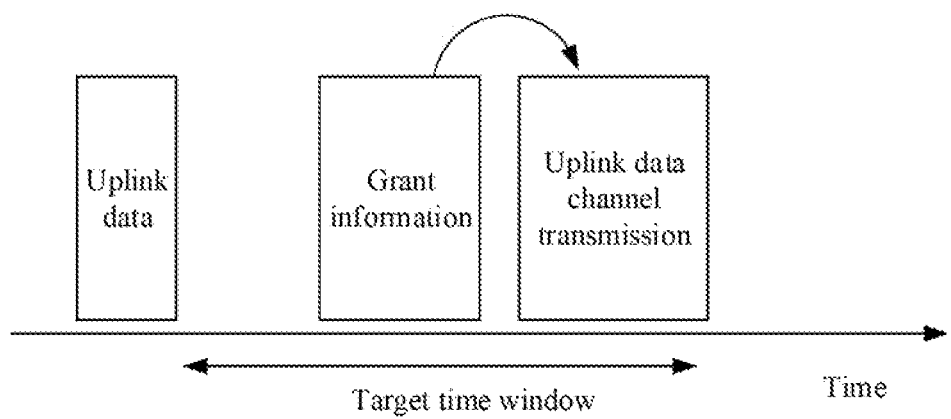
FIG. 2F is a schematic diagram illustrating that a network device receives uplink data correctly according to an embodiment of the present disclosure.
Figure 2G:
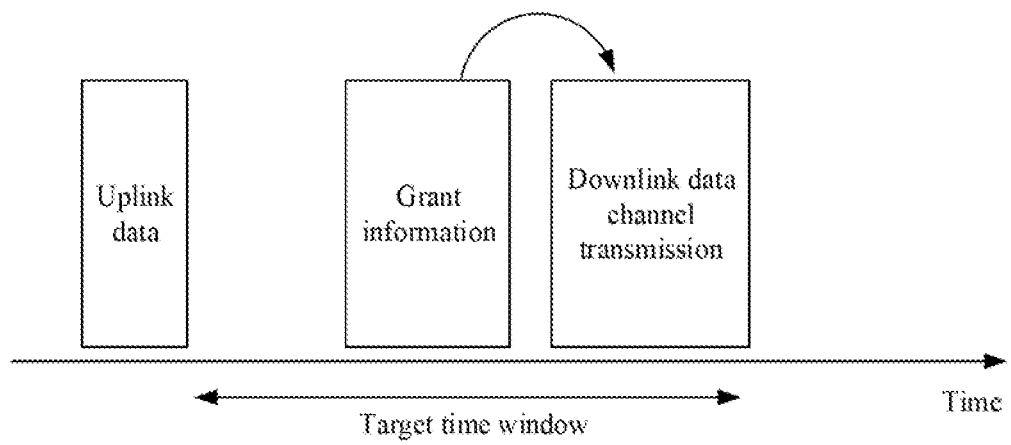
FIG. 2G is another schematic diagram illustrating that a network device receives uplink data correctly according to an embodiment of the present disclosure.

In specific implementation, as shown in FIG. 2F, a process of the terminal determining that the detection result is that the grant information is received and determining that the network device receives the uplink data correctly may include the following operation.

The terminal determines that the detection result is that the grant information is received, the grant information being to schedule uplink data transmission, and determines that the network device receives the uplink data correctly.

In specific implementation, as shown in FIG. 2Q a process of the terminal determining that the detection result is that the grant information is received and determining that the network device receives the uplink data correctly may include the following operation.

The terminal determines that the detection result is that the grant information is received, the grant information being to schedule transmission of downlink data, and determines that the network device receives the uplink data correctly.

In a possible example, a process of the terminal determining whether to retransmit the uplink data based on the detection result may include the following operation.

In a case that it is determined by the terminal that the detection result is that the grant information is received and that a value of an information field of the grant information is a preset value, the terminal determines that the network device receives the uplink data correctly.

For example, in a case where the value of the information field is one, it is indicated that the network device receives the uplink data correctly.

Figure 2H:
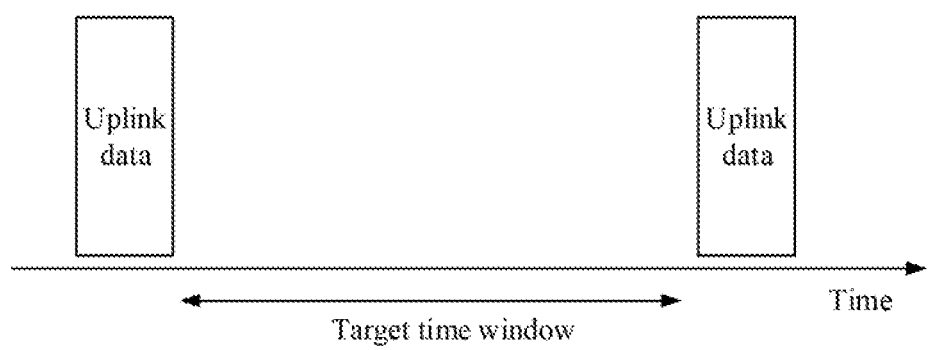
FIG. 2H is a schematic diagram illustrating that a terminal determines to retransmit uplink data according to an embodiment of the present disclosure.

In a possible example, a process of the terminal determining whether to retransmit the uplink data based on the detection result may include any one of the following operations:

the terminal determines that the detection result is that the grant information is not received, and determines that the network device does not receive the uplink data correctly; or, in a case where it is determined by the terminal that the detection result is that the grant information is received, a value of an information field of the grant information being not equal to a preset value, the terminal determines that the network device does not receive the uplink data correctly; or, as shown in FIG. 2H, the terminal determines that the detection result is that the grant information is not received, and determines to retransmit the uplink data; or, in a case where it is determined by the terminal that the detection result is that the grant information is received, a value of an information field of the grant information being not equal to a preset value, the terminal determines to retransmit the uplink data.

In a possible example, the configuration information is invalid information, the invalid information being used by the terminal to determine that the data transmission channel indicated by the grant information does not schedule data transmission.

In a case where the value of a specific information field of the grant information is a preset value, the configuration information indicated by the grant information is invalid information.

Technical solutions of the embodiments in the present disclosure are described from an aspect of interaction between each of network elements above. It may be understood that each of the terminal and the network device, in order to implement the above functions, may include corresponding hardware structures and/or software modules for performing the functions. Those skilled in the art should easily understand that the present disclosure can be implemented in the form of hardware or combination of hardware and computer software in conjunction with the units and algorithm steps in the examples described in the embodiments of the present disclosure. Whether a function is performed in the form of hardware or computer software-driven hardware depends on a specific application and a design constraint of the technical solution. Those skilled in the art may implement the described functions in different ways for each particular application, but such implementation should not be considered beyond the scope of the present disclosure.

The embodiments of the present disclosure may divide a terminal and a network device into functional units based on the above method examples. For example, each functional unit may be divided corresponding to each function, and two or more functions may be integrated into one processing unit. The integrated unit may be implemented in the form of hardware or software functional unit. It should be noted that the division of units in the embodiments of the present disclosure is schematic and is only a logical function division, and there may be other divisions in actual implementation.

Figure 3A:
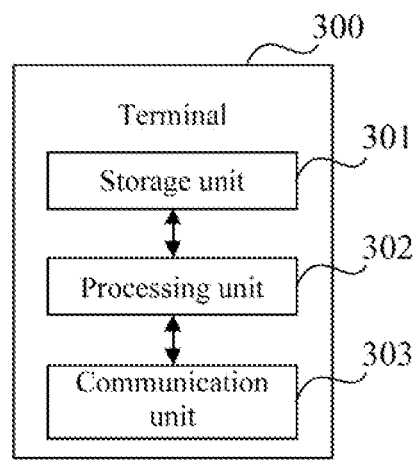
FIG. 3A is a constitution block diagram of function units of a terminal according to an embodiment of the present disclosure.

In a case where an integrated unit is adopted, FIG. 3A shows a possible schematic structural diagram of a first core network device according to the above embodiments. A terminal 300 includes a processing unit 302 and a communication unit 303. The processing unit 302 is configured to control and manage an action of the terminal, for example, the processing unit 302 is configured to support the terminal in performing operations 201, 204, and 205 in FIG. 2A and/or other processes of the technology described herein. The communication unit 303 is configured to support communication between the terminal and other devices, such as communication between the terminal and the network devices shown in FIG. 1. The terminal may further include a storage unit 301 configured to store program codes and data of the terminal.

The processing unit 302 may be a processor or a controller, such as a Central Processing Unit (CPU), a general purpose processor, a Digital Signal Processor (DSP), an Application-Specific Integrated Circuit (ASIC), a Field Programmable Gate Array (FPGA) or other programmable logic devices, transistor logic devices, hardware components, or any combination thereof. The processing unit 302 may implement or perform various exemplary logic boxes, modules, and circuits described in conjunction with contents of the present disclosure. The processor may also be a combination for implementing computing functions, such as a combination of one or more microprocessors, a combination of DSP and microprocessors, and the like. The communication unit 303 may be a transceiver, a transceiver circuit, and the like, and the storage unit 301 may be a memory.

The processing unit 302 may be configured to: transmit uplink data through the communication unit 303 in a grant-free manner; detect grant information within a target time window and generate a detection result, the grant information being to indicate configuration information of a data transmission channel; and determine whether to retransmit the uplink data based on the detection result.

In a possible example, the processing unit 302 may be further configured to receive indication information through the communication unit 303, the indication information being to indicate a length of the target time window and/or a start position of the target time window.

In a possible example, the start position of the target time window may be any one of the following:

an ending position of the uplink data, an ending position of a time unit for the uplink data, a start position of a A-th time unit after the time unit for the uplink data, and a start position of a B-th downlink control information transmission unit after the uplink data, where A and B are positive integers.

In a possible example, the target time window may include L downlink control information transmission units, the downlink control information transmission unit being configured to transmit downlink control signaling, L is a positive integer.

In a possible example, the grant information may be to schedule transmission of uplink data, or the grant information may be to schedule transmission of uplink data, a time length for transmitting the uplink data being equal to a length of a target time unit, the target time unit being a time unit in which the terminal transmits the uplink data in the grant-free manner.

In a possible example, the grant information may be to schedule downlink data transmission.

In a possible example, the processing unit 302 may be specifically configured to determine that the detection result is that the grant information is received, and to determine that the network device receives the uplink data correctly.

In a possible example, the processing unit 302 may be specifically configured to determine that the network device receives the uplink data correctly in a case where it is determined that the detection result is that the grant information is received and a value of an information field of the grant information is a preset value.

In a possible example, the processing unit 302 may be specifically configured to: determine that the detection result is that the grant information is not received, and determine that the network device does not receive the uplink data correctly; or determine that the network device does not receive the uplink data correctly in a case where it is determined that the detection result is that the grant information is received and a value of an information field of the grant information is not a preset value; or determine that the detection result is that the grant information is not received, and determine to retransmit the uplink data; or determine to retransmit the uplink data in a case where it is determined that the detection result is that the grant information is received, and a value of an information field of the grant information is not a preset value.

In a possible example, the target time window may include N time units, a length of each of the N time units being equal to a length of a target time unit, the target time unit being a time unit in which the terminal transmits the uplink data in the grant-free manner, N being a positive integer; or the target time window may include N time units, a length of each of the N time units being equal to a length of a downlink data transmission unit, the downlink data transmission unit being configured to transmit the downlink data by the network device.

In a possible example, the configuration information may be invalid information, the invalid information being used by the terminal to determine that the data transmission channel indicated by the grant information does not schedule data transmission.

Figure 3B:
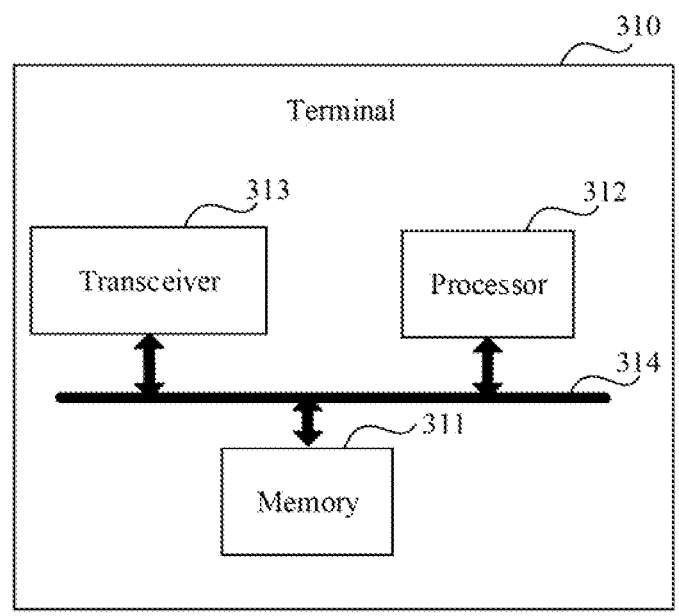
FIG. 3B is a schematic structural diagram of a terminal according to an embodiment of the present disclosure.

In a case where the processing unit 302 is a processor, the communication unit 303 is a communication interface, and the storage unit 301 is a memory, the terminal involved in the embodiment of the present disclosure may be the terminal as shown in FIG. 3B.

As shown in FIG. 3B, the terminal 310 includes a processor 312, a communication interface 313, and a memory 311. Optionally, the terminal 310 may further include a bus 314. The communication interface 313, the processor 312, and the memory 311 may be connected to each other via the bus 314. The bus 314 may be a Peripheral Component Interconnection standard (PCI) bus or an Extended Industrial Standard Architecture (EISA) bus, and the like. The bus 314 may include an address bus, a data bus, a control bus, and the like. For ease of representation, in FIG. 3B, only one thick line is used for representing the bus, but it does not mean that there is only one bus or one type of bus.

The terminal shown in FIG. 3A or FIG. 3B may also be understood as a device for the terminal, which is not limited in the embodiments of the present disclosure.

In a case where an integrated unit is adopted, FIG. 4 shows a possible schematic structural diagram of a network device involved in the above embodiment. A network device 400 includes a processing unit 402 and a communication unit 403. The processing unit 402 is configured to control and manage an action of the network device, for example, the processing unit 402 is configured to support the network device in performing operation 401 in FIG. 2A and/or other processes of the technology described herein. The communication unit 403 is configured to support communication between the network device and other devices, such as communication between the network device and the terminal as shown in FIG. 1. The network device may further include a storage unit 401 configured to store program codes and data of the network device.

The processing unit 402 may be configured to: correctly receive, through the communication unit 403, uplink data transmitted by the terminal in a grant-free manner; transmit grant information within a target time window, the grant information being to inform the terminal that the network device receives the uplink data correctly, and indicate configuration information of a data transmission channel.

In a possible example, the processing unit 402 may be further configured to transmit indication information through the communication unit 403, the indication information being to indicate a length of the target time window and/or a start position of the target time window.

In a possible example, the start position of the target time window may be any one of the following:

an ending position of the uplink data, an ending position of a time unit for the uplink data, a start position of a A-th time unit after the time unit for the uplink data, and a start position of a B-th downlink control information transmission unit after the uplink data, where A and B are positive integers.

In a possible example, the target time window may include L downlink control information transmission units, the downlink control information transmission unit being configured to transmit downlink control signaling, L being a positive integer.

In a possible example, the grant information may be to schedule transmission of uplink data; or the grant information may be to schedule transmission of uplink data, a time length for transmitting the uplink data is equal to a length of a target time unit, the target time unit is a time unit in which the terminal transmits the uplink data in the grant-free manner.

In a possible example, the grant information may be to schedule downlink data transmission.

In a possible example, a value of an information field of the grant information may be a preset value.

In a possible example, the target time window may include N time units, a length of each of the N time unit being equal to a length of a target time unit, the target time unit being a time unit in which the terminal transmits the uplink data in the grant-free manner, N being a positive integer; or the target time window may include N time units, a length of each of the N time unit being equal to a length of a downlink data transmission unit, the downlink data transmission unit being configured to transmit the downlink data by the network device.

In a possible example, the configuration information may be invalid information, the invalid information being used by the terminal to determine that the data transmission channel indicated by the grant information does not schedule data transmission.

Figure 4A:
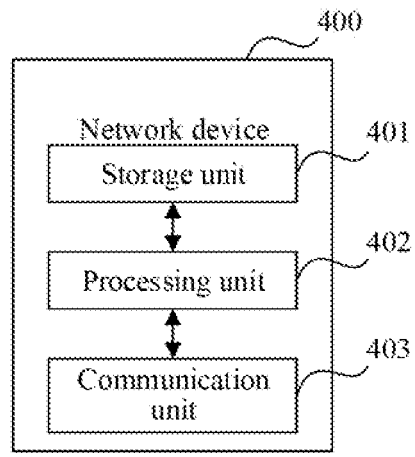
FIG. 4A is a constitution block diagram of function units of a network device according to an embodiment of the present disclosure.
Figure 4B:
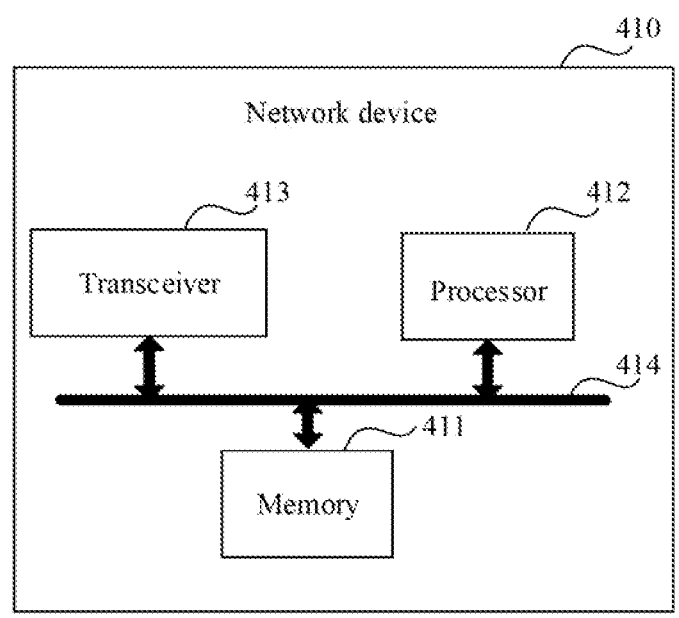
FIG. 4B is a schematic structural diagram of a network device according to an embodiment of the present disclosure.

In a case where the processing unit 402 is a processer, the communication unit 403 is a communication interface, and the storage unit 401 is a memory, the network device involved in the embodiments of the present disclosure may be the network device as shown in FIG. 4B.

As shown in FIG. 4B, the network device 410 includes: a processor 412, a communication interface 413 and a memory 411. Optionally, the network device 410 may further include a bus 414. The communication interface 413, the processor 412, and the memory 411 may be connected to each other via the bus 414. The bus 414 may be a Peripheral Component Interconnection standard (PCI) bus or an Extended Industrial Standard Architecture (EISA) bus, and the like. The bus 414 may include an address bus, a data bus, a control bus, and the like. For ease of representation, only one thick line is used for representing the bus in FIG. 4B, which does not mean that there is only one bus or one type of bus.

The network device shown in FIG. 4A or FIG. 4B may also be understood as an apparatus for a network device, which is not limited in the embodiments of the present disclosure.

Figure 5:
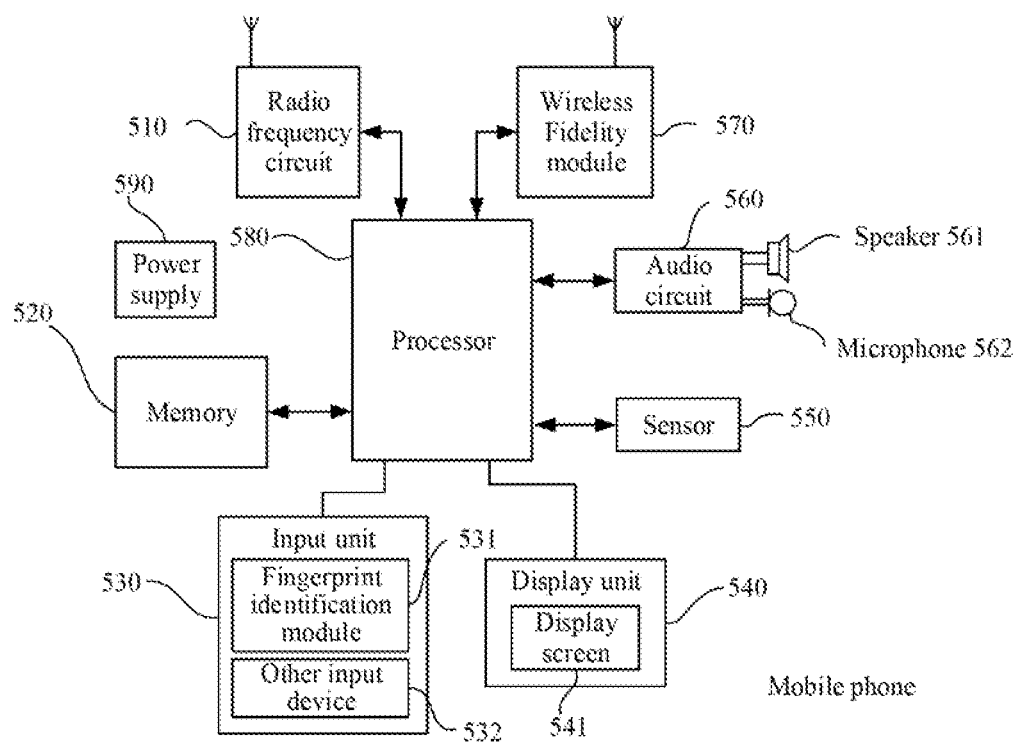
FIG. 5 is a schematic structural diagram of another terminal according to an embodiment of the present disclosure.

Another terminal is further provided in an embodiment of the present disclosure, as shown in FIG. 5, for ease of description, only the parts related to the embodiments of the present disclosure are shown in FIG. 5. For specific technical details not shown herein, reference may be made to the method embodiments of the present disclosure. The terminal may be a mobile phone, a tablet, a Personal Digital Assistant (PDA), a Point of Sales (POS), an on-board computer or other terminal devices. A mobile phone is taken as an example of the terminal.

FIG. 5 is a block diagram showing the structure of part of a mobile phone related to the terminal according to the embodiment of the present disclosure. As shown in FIG. 5, the mobile phone includes: a radio frequency (RF) circuit 510, a memory 520, an input unit 530, a display unit 540, a sensor 550, an audio circuit 560, a Wireless Fidelity (WiFi) module 570, a processor 580, a power supply 590 and other components. Those skilled in the art may understand that the structure of the mobile phone shown in FIG. 5 is not to limit the mobile phone. More or fewer components than the ones shown in FIG. 5 may be included, some components may be combined, or components may be arranged in different ways.

The components of the mobile phone are described in detail in conjunction with FIG. 5.

The RF circuit 510 may be configured to receive and transmit information. Generally, the RF circuit 510 includes, but is not limited to, an antenna, at least one amplifier, a transceiver, a coupler, a Low Noise Amplifier (LNA), a duplexer, and the like. In addition, the RF circuit 510 may further communicate with a network and other devices via wireless communication. The above wireless communication may adopt any communication standard or protocol, including but not limited to Global System of Mobile communication (GSM), General Packet Radio Service (GPRS), Code Division Multiple Access (CDMAA), Wideband Code Division Multiple Access (WCDMA), Long Term Evolution (LTE), E-mail, Short Messaging Service (SMS), and the like.

The memory 520 may be configured to store software programs and modules, and the processor 580 may execute various functional applications and data processing of the mobile phone by running the software programs and modules stored in the memory 520. The memory 520 may mainly include a program storage area and a data storage area. The program storage area may store an operation system, an application program required for at least one function, and the like; the storage data area may store data created based on usage of the mobile phone, and the like. Moreover, the memory 520 may include a high-speed random access memory, and may further include a non-volatile memory, such as at least one magnetic disk storage device, flash memory device, or other volatile solid state storage device.

The input unit 530 may be configured to receive inputted digital or character information, and generate key signal input related to user settings and function control of the mobile phone. Specifically, the input unit 530 may include a fingerprint identification module 531 and other input devices 532. The fingerprint identification module 531 may collect fingerprint data of a user. In addition to the fingerprint identification module 531, the input unit 530 may also include other input devices 532. Specifically, other input devices 532 may include, but are not limited to, one or more of a touch screen, a physical keyboard, a function key (such as a volume control button, a switch button, etc.), a trackball, a mouse, a joystick, and the like.

The display unit 540 may be configured to display information inputted by a user or information provided for the user and various menus of the mobile phone. The display unit 540 may include a display screen 541. Optionally, the display screen 541 may be configured with a liquid crystal display (LCD), an organic light-emitting diode (OLED), or the like. Although in FIG. 5, the fingerprint identification module 531 and the display screen 541 are configured as two independent components to implement input and playback functions of the mobile phone, in some embodiments, the fingerprint identification module 531 and the display screen 541 may be integrated together to implement the input and playback functions of the mobile phone.

The mobile phone may further include at least one type of sensor 550, such as a light sensor, a motion sensor, and other sensors. Specifically, the light sensor may include an ambient light sensor and a proximity sensor. The ambient light sensor may adjust brightness of the display screen 541 based on brightness of the ambient light, and the proximity sensor may turn off the display screen 541 and/or backlight when the mobile phone is moved to the ear. As one type of motion sensors, an accelerometer sensor may detect magnitudes of acceleration in all directions (generally in three axes), and detect a magnitude and a direction of gravity in a case where the mobile phone remains stationary, and may be configured to identify the statuses of the mobile phone (such as switching between a horizontal screen and a vertical screen, related games, calibration of magnetometer attitude) and may be configured for vibrational recognition of related functions (such as pedometer, tapping), etc. Other sensors such as gyroscopes, barometers, hygrometers, thermometers, infrared sensors that may be further configured in the mobile phone are not repeated herein.

An audio circuit 560, a speaker 561, and a microphone 562 may provide an audio interface between a user and the mobile phone. The audio circuit 560 may transmit a received electrical signal which is converted from audio data to the speaker 561, and the speaker 561 may convert the electrical signal to a sound signal for playback. In addition, the microphone 562 may convert a collected sound signal to an electrical signal, and the audio circuit 560 may receive the electrical signal and convert the electrical signal to audio data. After the audio data is processed by the processor 580, the audio data may be transmitted to another mobile phone via the RF circuit 510, or may be played to the memory 520 for further processing.

Wi-Fi is a short-range wireless transmission technology. The WiFi module 570 of the mobile phone may assist a user to send and receive e-mails, browse web pages, and access streaming media, thereby providing wireless broadband Internet access for the user. Although FIG. 5 shows the WiFi module 570, it may be understood that it is not necessary for the mobile phone, but may be omitted as needed without departing from the scope of the essence of the present disclosure.

The processor 580 is a control center of the mobile phone, which may be connected to various portions of the mobile phone via various interfaces and lines. The processor 580 may execute various functions of the mobile phone and process data of the mobile phone by running or executing the software programs and/or the modules stored in the memory 520 and invoking the data stored in the memory 520, thereby monitoring the mobile phone as a whole. Optionally, the processor 580 may include one or more processing units; as an example, the processor 580 may integrate an application processor and a modem processor, the application processor being mainly for processing an operation system, a user interface, an application and the like, the modem processor being mainly for processing wireless communication. It may be understood that the above modem processor may also be not integrated into the processor 580.

The mobile phone may further include a power supply 590 for charging each component (such as battery). As an example, the power supply may be connected to the processor 580 logically via a power management system, so as to implement management of charging and discharging, power consumption management and other functions through the power management system.

The mobile phone may also include a camera, a Bluetooth module, etc., which will not be described herein, although they are not shown in FIG. 5.

In the above embodiments shown in FIG. 2A, a process at a terminal side in each operation of the method may be implemented based on the structure of the mobile phone.

In the above embodiments shown in FIG. 3A-FIG. 3B, the function of each unit may be implemented based on the structure of the mobile phone.

A computer storage medium is further provided in an embodiment of the present disclosure. The computer storage medium may store a program. When the program is executed, part or all of the operations of any one of the data transmission methods as described in the method embodiments above may be performed.

The operations of the methods or the algorithms described in the embodiments of the present disclosure may be implemented by hardware or a processor executing software instructions. The software instructions may be composed of software modules that may be stored in a Random Access Memory (RAM), a flash memory, a Read Only Memory (ROM), an Erasable Programmable ROM (EPROM), an Electrically EPROM (EEPROM), a register, a hard disk, a removable hard disk, a Compact Disc-Read Only Memory (CD-ROM), or any other types of storage medium known in the art. An exemplary storage medium may be coupled to the processor such that the processor can read information from the storage medium and write information to the storage medium. Apparently, the storage medium may also be a part of the processor. The processor and the storage media may be arranged in an ASIC. In addition, the ASIC may be arranged in a gateway device or a mobility management element. Apparently, the processor and the storage media may also be arranged in a gateway device or a mobility management element as discrete components.

Those skilled in the art should be aware that in one or more of the above examples, the functions described in the embodiment of the disclosure may be implemented by hardware, software, firmware or any combination thereof. When the functions are implemented with software, these functions may be stored in a computer readable storage medium or may be transmitted as one or more instructions or codes in the computer readable storage medium. The computer readable storage medium may include a computer storage medium and a communication medium. The communication medium may include any medium that can facilitate the transmission of the computer program from one place to another place. The storage medium may be any available medium that can be accessed by general or dedicated computers.

The objects, technical solutions, and beneficial effects of the present disclosure are further described in detail in the aforementioned specific embodiments. It should be understood that the above are only specific embodiments of the present disclosure and are not intended to limit the protection scope of the embodiments of the present disclosure. Any modification, equivalent replacement or improvement made based on the technical solutions of the embodiments of the present disclosure shall fall in the protection scope of the present disclosure.

The invention claimed is:

1. A method for data transmission, comprising:
  transmitting, by a terminal, uplink data without grant information; and
  retransmitting, by the terminal, the uplink data in a case that grant information is detected by the terminal within a target time window and a value of an information field in the grant information is a preset value, wherein the grant information is configured to indicate configuration information of an uplink data transmission channel, and the preset value is used for indicating whether the network device receives the uplink data correctly or not,
  wherein the method further comprises:
  receiving, by the terminal, indication information, wherein a start position of the target time window is determined based on the indication information.

2. The method according to claim 1,
  wherein the indication information is configured to indicate a length of the target time window.

3. The method according to claim 1, wherein the grant information is configured to schedule uplink data transmission.

4. The method according to claim 1, further comprising:
not retransmitting, by the terminal, the uplink data in a case that the grant information is detected by the terminal within the target time window and the value of the information field of the grant information is not the preset value.

5. The method according to claim 1, wherein the preset value is 0.

6. The method according to claim 1, wherein the target time window comprises N times units, N being a positive integer.

7. A data transmission method, comprising:
receiving, by a network device, uplink data without grant information from a terminal;
transmitting, by the network device, grant information within a target time window, wherein the grant information is configured to indicate configuration information of an uplink data transmission channel, and a value of an information field of the grant information is a preset value, wherein the preset value is used for indicating whether the network device receives the uplink data correctly or not; and
receiving, by the network device, the uplink data again in a case that the grant information is received by the terminal within the target time window,
wherein the method further comprises:
transmitting, by the network device, indication information, wherein a start position of the target time window is determined based on the indication information.

8. The method according to claim 7,
wherein the indication information is configured to indicate a length of the target time window.

9. The method according to claim 7, wherein the grant information is configured to schedule uplink data transmission.

10. The method according to claim 7, further comprising:
transmitting, by the network device, the grant information within the target time window, wherein the value of the information field of the grant information is not the preset value.

11. The method according to claim 7, wherein the preset value is 0.

12. The method according to claim 7, wherein the target time window comprises N times units, N being a positive integer.

13. A terminal, comprising: a processor and a transceiver configured to transmit and receive information under control of the processor,
wherein the transceiver is configured to:
transmit uplink data without grant information; and
retransmit the uplink data in a case that grant information is detected by the terminal within a target time window and a value of an information field of the grant information is a preset value, wherein the grant information is configured to indicate configuration information of an uplink data transmission channel, and the preset value is used for indicating whether the network device receives the uplink data correctly or not,
wherein the transceiver is further configured to receive indication information, wherein a start position of the target time window is determined based on the indication information.

14. The terminal according to claim 13, wherein the indication information is configured to indicate a length of the target time window.

15. The terminal according to claim 13, wherein the grant information is configured to schedule uplink data transmission.

16. The terminal according to claim 13, wherein the transceiver is further configured to not retransmit the uplink data in a case that the grant information is detected by the terminal within the target time window and the value of the information field of the grant information is not the preset value.

17. The terminal according to claim 13, the preset value is 0.

* * * * *